Nov. 21, 1939.          F. R. BALCAR                 2,180,386
         SEPARATION OF ACETYLENE FROM GASEOUS MIXTURES
                       Filed July 30, 1937
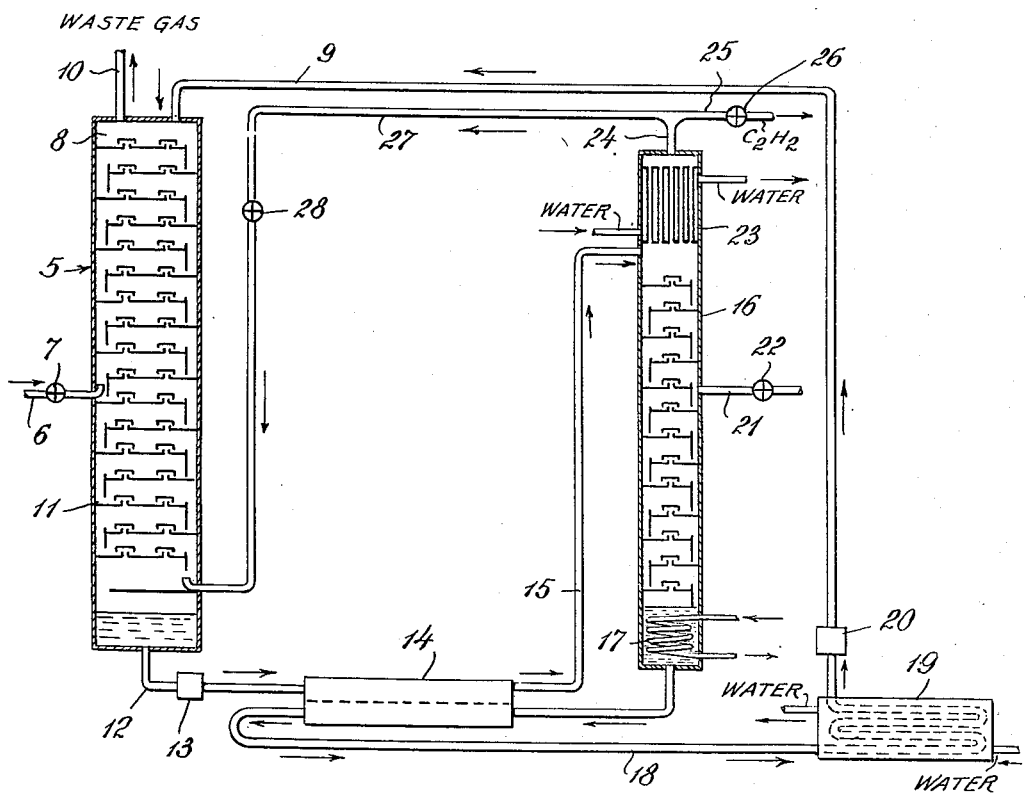
INVENTOR
Frederick R. Balcar
BY
Pennie Davis Marvin & Edmonds
ATTORNEYS Patented Nov. 21, 1939

2,180,386

UNITED STATES PATENT OFFICE 2,180,386

SEPARATION OF ACETYLENE FROM GASEOUS MIXTURES

Frederick R. Balcar, Stamford, Conn., assignor to Air Reduction Company, Incorporated, New York, N. Y., a corporation of New York Application July 30, 1937, Serial No. 156,464

8 Claims. (Cl. 260—679)

This invention relates to a process for separating acetylene from gaseous mixtures containing it in substantial purity and with substantially complete recovery.

Examples of gas mixtures for which the process may advantageously be applied are the mixtures resulting from the operation known as cracking oils or other carbonaceous fuels, that is to say for example, reducing the heavier hydrocarbons which occur normally in the solid or liquid state, to lighter hydrocarbons, such as acetylene, ethylene and propylene. Such mixtures usually contain as impurities the gases resulting from incomplete combustion, for example, carbon dioxide, carbon monoxide and hydrogen.

It has long been known that certain substances, such as acetone, diethyl carbonate and various other organic liquids, dissolve acetylene preferentially from gaseous mixtures containing it. Acetylene, e. g. as it occurs in the trade, is a solution of acetylene gas in acetone, or dimethyl ketone, the latter being contained in a steel cylinder filled with some absorbent material such as balsa wood or corn pith. In U. S. Patent No. 1,854,141, to G. F. Horsley, "Removal of acetylene from gases", a number of absorbent liquids suitable for solution of acetylene are described. This patent also states very clearly the ideal qualities of a solvent to be used for separating acetylene selectively from a gaseous mixture.

1. High solubility for acetylene with low solubility for other gases.
2. High boiling point and low vapor pressure at ordinary temperatures.
3. Low viscosity in order to ensure efficient wetting of the packing in an absorption tower.
4. Stability at the boiling point.
5. No chemical reaction with acetylene or other gases such as methane or olefines, etc. In the method forming the subject matter of the present invention, any one or a plurality of these substances, having the properties above quoted, may be utilized as solvent for acetylene.

It is the object of the present invention to provide an improved and highly efficient process for separating acetylene from gaseous mixtures containing it by utilizing solvents of the character described for absorption with continuous purification and release of the absorbed acetylene to permit recirculation of the solvent.

Other features and advantages of the present process will become evident by consideration of the following specification and accompanying drawing, which illustrates diagrammatically one form of apparatus, by means of which the method in question may be carried out.

The gaseous mixture, containing acetylene and the various impurities above named, enters a combined purifier and absorber column 5, by means of pipe 6 and valve 7. This mixed vapor, as a result of a slight gradient of pressure between the bottom and the top of column 5, flows upward through the trays or pans of the absorber 8, constituting roughly the upper half of the column 5. The acetylene component in the incoming gaseous mixture dissolves in the descending solvent liquid which enters the top of absorber 8 through pipe 9. The source of this liquid will be considered later on in the description. All the components of the gaseous mixture entering through valve 7 will be dissolved by the descending solvent, according to their specific solubilities therein under the conditions of temperature and pressure prevailing in absorber 8.

The component stated above, for example, acetylene, will dissolve in the solvent liquid to a greater degree than any of the other components, that is to say, Henry's ratio $$\frac{\bar{\bar{P}}_A}{\bar{\bar{D}}_A}$$

is less under the conditions prevailing in absorber 8 than for ane other component. In Henry's ratio $$\bar{\bar{P}}_A$$

is the partial pressure in the vapor of component A=acetylene, while $$\bar{D}_A$$

represents the resulting concentration or partial density of the acetylene contained in the liquid phase. If the solution is such as to obey the laws of a perfect solution, Henry's ratio is constant for any one component, that is, any one component carries with it a specific value of Henry's ratio. Any component A, for which Henry's ratio is less than for a second component B, is said to have a higher solubility in the solvent than component B. In the present case, acetylene is assumed to have a higher solubility in the solvent employed than any other component.

We should bear in mind throughout the following discussion that Henry's ratio is generally a function of the temperature of the solution and also of the various partial pressures of the components present. Throughout the following discussion, however, we shall assume that the solution is a perfect solution, that is to say, each component has a value of Henry's ratio, which is independent of the presence or absence of the other components. This assumption is known as Dalton's law. The statement or assumption that Henry's ratio is a constant with temperature for any one component is called Henry's law.

With these facts in mind, it is clear that the descending liquid in the absorber when it reaches the level of value 7 contains in solution all components of the entering gas mixture, acetylene being present in greater amount per unit of partial acetylene pressure than the other components. This condition, while true for acetylene at the level of valve 7, would not necessarily be true at other levels where the temperature is different from that at the level of valve 7. If a solvent contains several solutes in the solution which are gaseous somewhere in the temperature range of the operation, those components whose boiling points are highest will persist longest when the temperature is raised. This statement, it must be remembered, is true only in case of a perfect solution and does not hold if azeotropism occurs between any two components.

From the standpoint of the present application as a method for separating acetylene then, there are two properties of the components of the mixture to be kept in mind, namely (1) specific solubility at various temperatures and (2) the specific volatility. For example, in the present case the rate of evaporation of components having higher boiling points than acetylene, increases with an increase in temperature at a lower rate than does the rate of evaporation of acetylene. When the boiling point of a component is attained by the solution, that component tends to disappear altogether from the solution, irrespective of the relation between its Henry's ratio and Henry's ratio for some other component at temperatures below the boiling point.

It is thus very evident that in absorber 8 the components of low solubility and high volatility will escape very readily through the waste gas outlet 10, while components whose solubility is high and volatility low will be carried downward by the descending solvent and will occur in the cool liquid collecting at the bottom of the column 5. In order to proceed with the separation of the liquid mixture reaching the level of valve 7 in the column 5, that liquid is allowed to flow downward over a series of trays, which we call collectively the purifier indicated as 11. In this part of the apparatus, the descending liquid comes in direct contact with the ascending vapors, but ultimately collects at the bottom of the purifier 11 as a liquid rich in acetylene, containing as impurities components both more and less volatile under the conditions at that point than acetylene; also components both more and less soluble in the solvent than is acetylene.

The vapors ascending in purifier 11 are composed of practically pure acetylene, which is derived from the liquid collecting at the bottom as follows: This liquid is conducted from the bottom of purifier 11 by pipe 12 and pump 13 to exchanger 14, wherein its temperature is raised by coming into direct thermal contact with a warmer liquid flowing in the opopsite direction through exchanger 14. The liquid containing dissolved acetylene is then conducted through pipe 15 to the top of a rectifier 16, wherein it descends over trays or pans of the usual type in direct thermal contact with a vapor rising from the bottom, produced by evaporating at the bottom by means of coil 17 a part of the liquid collecting at that point in the system. The unevaporated portion of this liquid passes through exchanger 14 counter-current to the liquid coming from purifier 11 and then through pipe 18, enters a water cooler 19 from which it is pumped by pump 20 to the top level of absorber 8 through pipe 9 as already described.

That portion of the liquid entering rectifier 16 evaporated by heating coil 17, ascends rectifier 16, coming into thermal contact with the liquid entering through pipe 15. This vapor consists of practically all the impurities leaving purifier 11 and includes components less volatile than acetylene, such as propylene and propane. At an intermediate level in rectifier 16, an outlet is provided for vapor or liquid drawn from the interior of rectifier 16 through pipe 21 and valve 22.

The whole cycle, which without outlet 21 would include only two outlets, one for the pure acetylene product and the other for the waste gas, is provided with a third outlet at a point practically coincident with the hottest point in the cycle and by means of which propylene, propane and butylene may be withdrawn from the cycle. The total pressure of the cycle may be reduced thus by the amount of the combined partial pressures of these low volatility components. If outlet 21 is not provided, then the only outlet for components such as propylene, propane and butylene, is either in the acetylene product, or else in the waste gas, and in either case the total pressure of the system must include the partial pressure of said low volatility components.

After passing outlet 21, the ascending vapor in rectifier 16 is further rectified and ultimately enters the top dephlegmator or condenser 23 by means of which it is still further purified of low volatility components. The uncondensed residue leaves condenser 23 through pipe 24 and is then divided into two parts, one of which passes out through pipe 25 and valve 26 constituting the acetylene product. The other part passes through pipe 27 and valve 28, constituting the vapor already referred to as being introduced at the lowest level in combined absorber and purifier 5.

The essential feature of the present method is the provision of an intermediate outlet 21, by means of which the fluids in the various parts of the system are freed more or less completely of low volatility impurities, that is of components whose boiling points are higher than that of acetylene. The solvent being thus freed from high boiling constituents, reacts more favorably in dissolving those constituents, including acetylene, of lower boiling points, and thus the efficiency and operation of the system is thereby improved.

Various changes may be made in the details of operation and in the apparatus employed without departing from the invention or sacrificing the advantages thereof.

I claim:

1. The method of recovering acetylene from gaseous mixtures which comprises bringing the gaseous mixture into contact with a solvent for acetylene until acetylene has been dissolved therein substantially to the limit of its solubility, rectifying the resultant acetylene-containing liquid with substantially pure gaseous acetylene to free it of impurities more volatile than acetylene, rectifying in a separate rectification zone the purified acetylene-containing liquid, boiling the liquid descending through said separate rectification zone to liberate contained acetylene together with impurities, passing the vapors from said boiling into said separate rectification zone for use during said rectification therein, separating impurities less volatile than acetylene liberated by said boiling at an intermediate level of said separate rectification zone, and returning a part of the acetylene effluent leaving said separate rectification zone for use as the acetylene for removing impurities from the liquid formed by bringing the initial gaseous mixture into contact with the solvent for acetylene.

2. The method of recovering acetylene from gaseous mixtures which comprises bringing the gaseous mixture into contact with a solvent for acetylene until acetylene has been dissolved therein substantially to the limit of its solubility, rectifying, at substantially the same pressure at which the acetylene was absorbed, the resultant acetylene-containing liquid with substantially pure gaseous acetylene to free it of impurities more volatile than acetylene, rectifying in a separate rectification zone the purified acetylene-containing liquid, boiling the liquid descending through said separate rectification zone to liberate contained acetylene together with impurities, passing the vapors from said boiling into said separate rectification zone for use during said rectification therein, separating impurities less volatile than acetylene liberated by said boiling at an intermediate level of said separate rectification zone, and returning a part of the acetylene effluent leaving said separate rectification zone for use as the acetylene for removing impurities from the liquid formed by bringing the initial gaseous mixture into contact with the solvent for acetylene.

3. The method of recovering acetylene from gaseous mixtures which comprises bringing the gaseous mixture into contact with a solvent for acetylene until acetylene has been dissolved therein substantially to the limit of its solubility, rectifying, at substantially the same pressure at which the acetylene was absorbed, the resultant acetylene-containing liquid with substantially pure gaseous acetylene to free it of impurities more volatile than acetylene, rectifying, in a separate rectification zone and at substantially the initial pressure of the gaseous mixture to be separated, the purified acetylene-containing liquid, boiling the liquid descending through said separate rectification zone to liberate contained acetylene together with impurities, passing the vapors from said boiling into said separate rectification zone for use during said rectification therein, separating impurities less volatile than acetylene liberated by said boiling at an intermediate level of said separate rectification zone, and returning a part of the acetylene effluent leaving said separate rectification zone for use as the acetylene for removing impurities from the liquid formed by bringing the initial gaseous mixture into contact with the solvent for acetylene.

4. The method of recovering acetylene from gaseous mixtures which comprises bringing the gaseous mixture into contact with a solvent for acetylene until acetylene has been dissolved therein substantially to the limit of its solubility, rectifying the resultant acetylene-containing liquid with substantially pure gaseous acetylene to free it of impurities more volatile than acetylene, rectifying in a separate rectification zone the purified acetylene-containing liquid, boiling the liquid descending through said separate rectification zone to liberate contained acetylene together with impurities, passing the vapors from said boiling into said separate rectification zone, for use during said rectification therein, withdrawing, in the gaseous state, impurities less volatile than acetylene liberated by said boiling at an intermediate level of said separate rectification zone, and returning a part of the acetylene effluent leaving said separate rectification zone for use as the acetylene for removing impurities from the liquid formed by bringing the initial gaseous mixture into contact with the solvent for acetylene.

5. The method of recovering acetylene from gaseous mixtures which comprises bringing the gaseous mixture into contact with a solvent for acetylene until acetylene has been dissolved therein substantially to the limit of its solubility, rectifying the resultant acetylene-containing liquid with substantially pure gaseous acetylene to free it of impurities more volatile than acetylene, rectifying in a separate rectification zone the purified acetylene-containing liquid, boiling the liquid descending through said separate rectification zone to liberate contained acetylene together with impurities, passing the vapors from said boiling into said separate rectification zone for use during said rectification therein, withdrawing, in the liquid state, impurities less volatile than acetylene liberated by said boiling at an intermediate level of said separate rectification zone, and returning a part of the acetylene effluent leaving said separate rectification zone for use as the acetylene for removing impurities from the liquid formed by bringing the initial gaseous mixture into contact with the solvent for acetylene.

6. The method of recovering acetylene from gaseous mixtures which comprises bringing the gaseous mixture into contact with a solvent for acetylene until acetylene has been dissolved therein substantially to the limit of its solubility, rectifying the resultant acetylene-containing liquid with substantially pure gaseous acetylene to free it of impurities more volatile than acetylene, rectifying in a separate rectification zone the purified acetylene-containing liquid, boiling the liquid descending through said separate rectification zone to liberate contained acetylene together with impurities, passing the vapors from said boiling into said separate rectification zone for use during said rectification therein, separating impurities less volatile than acetylene liberated by said boiling at an intermediate level of said separate rectification zone, purifying the acetylene effluent vapor leaving said separate rectification zone by condensing back a portion thereof as reflux liquid for said rectification therein, and returning a part of the acetylene effluent leaving said separate rectification zone, for use as the acetylene for removing impurities from the liquid formed by bringing the initial gaseous mixture into contact with the solvent for acetylene.

7. The method of recovering acetylene from gaseous mixtures which comprises bringing the gaseous mixture into contact with a solvent for acetylene until acetylene has been dissolved therein substantially to the limit of its solubility, rectifying, without addition or subtraction of heat, the resultant acetylene-containing liquid with substantially pure gaseous acetylene to free it of impurities more volatile than acetylene, rectifying in a separate rectification zone the purified acetylene-containing liquid, boiling the liquid descending through said separate rectification zone to liberate contained acetylene together with impurities, passing the vapors from said boiling into said separate rectification zone for use during said rectification therein, separating impurities less volatile than acetylene liberated by said boiling at an intermediate level of said separate rectification zone, and returning a part of the acetylene effluent leaving said separate rectification zone for use as the acetylene for removing impurities from the liquid formed by bringing the initial gaseous mixture into contact with the solvent for acetylene.

8. The method of recovering acetylene from gaseous mixtures which comprises bringing the gaseous mixture into contact with a solvent for acetylene until acetylene has been dissolved therein substantially to the limit of its solubility, rectifying the resultant acetylene-containing liquid with pure gaseous acetylene to free it of impurities more volatile than acetylene, rectifying in a separate rectification zone the purified acetylene-containing liquid without heat being added or abstracted except at the top and bottom of said zone, boiling the liquid descending through said separate rectification zone to liberate contained acetylene together with impurities, passing the vapors from said boiling into said separate rectification zone for use during said rectification therein, separating impurities less volatile than acetylene liberated by said boiling at an intermediate level of said separate rectification zone, and returning a part of the acetylene effluent leaving said separate rectification zone for use as the acetylene for removing impurities from the liquid formed by bringing the initial gaseous mixture into contact with the solvent for acetylene.

FREDERICK R. BALCAR.